Patented Jan. 20, 1942

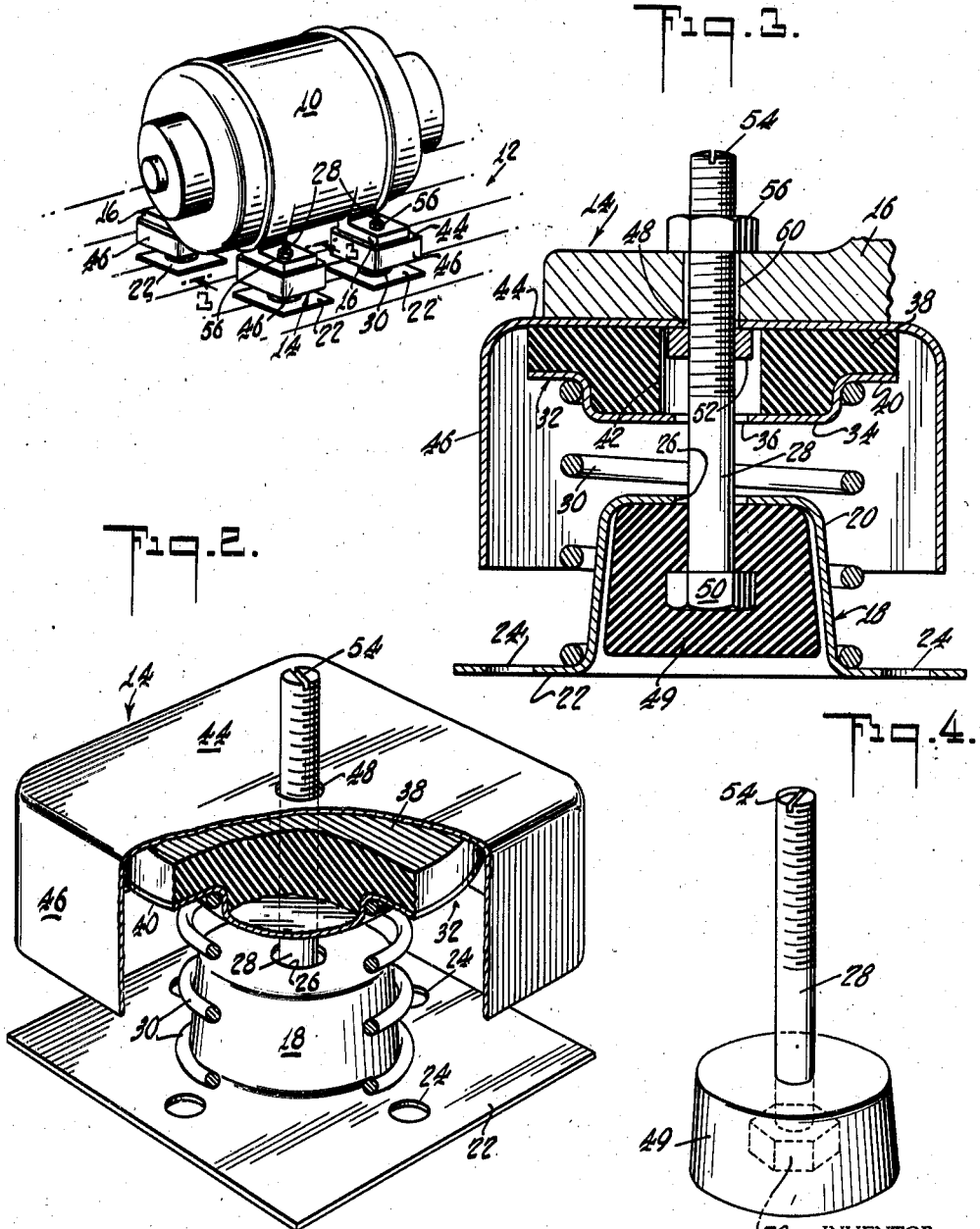
Jan. 20, 1942.  J. S. PARKINSON ET AL  2,270,335
VIBRATION ISOLATOR
Filed Dec. 30, 1939
INVENTOR.
John S. Parkinson
James Y. Dunbar
William A. Jack 3rd.
Virgil C. Kline
BY
ATTORNEY.

2,270,335

UNITED STATES PATENT OFFICE 2,270,335

VIBRATION ISOLATOR

John S. Parkinson, North Plainfield, N. J., James Y. Dunbar, New York, N Y., and William A. Jack, 3rd, North Plainfield, N. J., assignors to Johns-Manville Corporation, New York, N. Y., a corporation of New York Application December 30, 1939, Serial No. 311,908

11 Claims. (Cl. 248—21)

The present invention relates to machinery supports, and more particularly, to improved devices for mounting machinery in a manner to damp the vibrations created during normal operation.

It has long been recognized that the direct mounting of machines subject to vibration in operation on a floor or other foundation results in the transmission of undesirable and destructive vibrational movements directly to the foundation. Numerous proposals have heretofore been made to overcome this difficulty by the provision of vibration-damping or absorbing means between the machine and the floor or foundation, the prior proposals, however, having failed to provide effective solutions of all of the problems encountered.

The present invention has for its principal object the provision of an improved vibration isolator, and more particularly, the provision of an isolator or isolating mounting which will operate effectively to absorb the normal vibrational movements of the machine or apparatus carried thereby, and which additionally will exert an effective snubbing action to prevent vibrational movements of undue magnitude, such as tend to occur at certain times in the operation of the machine.

Another object of the invention is the provision of an improved isolating mounting as referred to above, which may be readily adjusted.

A further object of the invention is the provision of an isolating mounting so constructed as to permit the ready substitution of the spring means employed therein to accommodate the isolator to different loads.

Our invention will be more fully understood and further objects and advantages thereof will become apparent when reference is made to the more detailed description thereof which is to follow and to the accompanying drawing, in which:

Fig. 1 is a perspective view of a machine, such as an electric motor or the like, supported on vibration-isolating devices of the present invention;

Fig. 2 is a perspective view of a vibration-isolating mounting of the instant invention with parts broken away for clearness of illustration;

Fig. 3 is a sectional view taken on the line 3—3 of Fig. 1; and

Fig. 4 is a detail view depicting an element of the vibration isolator.

Referring now to the drawing, and particularly to Fig. 1, our invention is illustrated as employed in the mounting of a machine, such as a motor 10 or the like, on a suitable platform, floor, or other foundation 12. In accordance with the preferred arrangement, a vibration isolator 14 of the present invention is interposed between each of the several supporting feet 16 of the machine and the floor 12. It will be understood that a motor is shown only for the purposes of illustration and that the isolators may be employed to support any desired type of mechanical equipment or other vibration-generating devices or devices subject to vibration.

It will also be understood that although it is preferable to mount the machine directly upon the isolators 14, where this expedient cannot be employed the machinery may be carried by a suitable supporting platform, the platform, in turn, being supported from the foundation or floor by the isolators.

Referring now particularly to Figs. 2, 3 and 4, the isolator of the instant invention is illustrated in detail. The device comprises a base or bed plate 18, which in its preferred form consists of a hollow frusto-conical element 20 and a peripheral flange 22. The flange 22 is suitably provided with perforations 24 for the reception of means to secure the bed plate to the floor 12 or other foundation. The flange 22 and frusto-conical element 20 are suitably made as a unitary piece, for example, they may be a metal stamping or casting. The frusto-conical element is provided with a central aperture 26 of a diameter to permit an element 28, later to be described, to extend therethrough without contact.

A coil spring 30 rests upon the flange 22, the spring preferably having an inner diameter such as to fit snugly about the base of element 20. Spring 30 carries a load-bearing plate 32, suitably including a depressed central portion 34 of a diameter to fit snugly within the upper coil of the spring. Load-bearing plate 32 is also centrally apertured, as indicated at 36, to permit member 28 to extend therethrough without contacting the edges of the plate at the aperture. The load-bearing plate, similarly as the bed plate 18, is preferably made of sheet metal, but may be cast or otherwise suitably formed, if desired.

Load-bearing plate 32 carries a layer 38 of a resiliently compressible material, preferably a relatively thick rubber disc, which may extend into the depression 34 of the load-bearing plate or which may bridge thereacross. In the latter event, a washer is preferably secured beneath the disc to form a base for the same, the washer being of sufficient exterior diameter to rest upon the flange portions 40 of the load-bearing plate.

The rubber disc has a central bore 42 of sufficient diameter to accommodate a nut 52. The washer, if employed, has its central opening of a diameter substantially equal to the bore of the disc.

A cover plate 44 is preferably employed comprising an inverted box-like member having a skirt 46 extending downwardly to substantially enclose the isolator and to protect the same from injury. The cover plate is centrally apertured at 48. Fixedly secured to the interior of the cover plate, as by welding or the like, and in line with the aperture 48, is the nut 52 previously referred to.

Member 28 (see particularly Fig. 4) comprises a threaded bolt having its head 50 embedded in a frusto-conical body 49 of resilient compressible material, preferably rubber. The rubber body 49 constitutes a snubber for preventing movements of spring 30 of undue magnitude, as will be later more fully explained. The bolt is threaded for a substantial portion of its length, the threads corresponding to those of the nut 52 secured to the cover plate. The threaded end of the bolt is provided with a kerf 54, or is otherwise constructed to receive a tool by which it may be bodily rotated.

As illustrated particularly in Figs. 2 and 3, member 28 extends through the aligned apertures in the members 18, 32 and 44, with its threaded portion threaded into the nut 52. It will be noted that, due to the greater diameters of the apertures in the members 18 and 32 as compared to the bolt, the latter is not in contact with any metal parts of the isolator below the disc 38.

To mount a machine on isolators 14 of the present invention, the isolators, completely assembled, are placed in selected positions to underlie each of the several feet of the machine, if direct mounting is possible, or otherwise to underlie the machine platform. The isolators are anchored to the floor or foundation by suitable means passing through perforations 24 in flange 22. The cover 46, carrying nut 52, is screwed down on bolt 28 until there is a slight amount of pre-loading, that is, until the rubber block or snubber 49 bears against the upper end of the frusto-conical element 20. The machine, or machine and platform, is then lowered on the isolators. With the application of the load the spring will compress, moving the rubber block 49 downwardly. Each of the isolators is then adjusted by turning the bolt 28 through the medium of a screw driver or the like inserted in the kerf 54 until, in a typical case, the rubber block is approximately halfway between the floor or foundation and the upper end of frusto-conical element 20. After each isolator is adjusted, nuts 56 are threaded on the extending ends of the bolts and turned down tightly (see Fig. 3).

Upon the operation of the machine, such as a motor, the springs 30 are free to vibrate, the vibrations created by the supported machine being substantially entirely reflected by these springs. However, vibrations of higher frequencies, such as also may occur and which are of too high a frequency to be absorbed by the springs, are absorbed by the rubber disc 38. It will be observed that there is no metal-to-metal contact between the foundation and the supported machine, whereby telegraphing of vibrations through the isolator is wholly prevented.

Oscillations of the machine of excessive amplitude are prevented by means of the snubbing action provided by compressible block or snubber 49. Thus, as will readily be observed, excessive upward surge of the machine, such as might be permitted by the spring 30 alone, will bring snubber 49 into contact with the upper wall of element 20. Due to the yieldable compressible nature of the snubber 49, the snubbing action will not, however, be abrupt, and hence, sudden jars to the equipment will be avoided. Similarly in the case of excessive downward surges, the lower face of snubber 49 is brought into contact with the floor or foundation to yieldingly resist further downward movement.

The adjustability of the snubbing device permits ready control of potential vibrational movements of excessive amplitude in any particular case. Thus, as an example of one instance, electric motors, when mounted on springs, have a tendency to dive when starting up because of the high initial torque reaction. Through the use of mountings of the present invention, this is readily controlled by adjusting the snubbers of the isolators on the down or dive side of the motor so that the blocks 49 are adjacent the floor and those on the upper side adjacent the end wall of element 20. In one particular case, it was determined that through this procedure the starting amplitude on a 310 lb. motor was reduced 40%.

An isolating mounting in accordance with the invention has the further advantage that it may readily be altered to accommodate different loads. Also, springs of various strength may be readily substituted to permit one style of isolator to be employed under many different loads. Thus, a supply of the different strength springs having the same interior diameter may be maintained and one spring substituted for another by merely removing the cover plate 44, disc 38 and load-bearing plate 32. As a result, the necessity of stocking a multiplicity of sizes of complete isolators for different uses is unnecessary.

Having thus described our invention in rather full detail, it will be understood by those skilled in the art that these details need not be strictly adhered to, but that various changes and modifications will suggest themselves without departing from the scope of our invention as defined by the subjoined claims.

What we claim is:

1. A vibration-isolating mounting comprising a bed plate, a load-bearing plate, spring means supporting the load-bearing plate from the bed plate, a resilient compressible non-metallic member overlying said load-bearing plate and arranged to support a vibratory device, and means for yieldingly restraining excessive oscillations of said spring means in both axial directions, said restraining means being supported beneath said bed plate.

2. A vibration-isolating mounting comprising a bed plate, a load-bearing plate, spring means supporting the load-bearing plate from the bed plate, a resilient compressible non-metallic member overlying said load-bearing plate, a cover plate overlying said compressible non-metallic member in non-contacting relationship to said load-bearing plate and providing a supporting surface for a vibratory device, and means supported beneath said bed plate for yieldingly restraining all oscillations of said spring means of excessive amplitude, said restraining means comprising a resiliently compressible body.

3. A vibration-isolating mounting comprising a bed plate, a load-bearing plate, spring means supporting the load-bearing plate from the bed plate, a bolt member projecting through said plates and out of contact therewith, a resilient body carried by, and extending above and below, an end of said bolt means beneath said bed plate, and a resilient compressible non-metallic member overlying said load-bearing plate and arranged to support a vibratory device.

4. A vibration-isolating mounting comprising a bed plate having a hollow raised central portion, a load-bearing plate, spring means supporting the load-bearing plate from the bed plate, a resilient compressible non-metallic member overlying said load-bearing plate and arranged to support a vibratory device, and means for yieldingly restraining excessive oscillations of said spring means in both axial directions, said restraining means being supported within said hollow raised central portion of the bed plate.

5. A vibration-isolating mounting comprising a bed plate including a hollow frusto-conical central portion, a load-bearing plate, a coil spring supporting the load-bearing plate from the bed plate and including an end resting upon the bed plate and surrounding said frusto-conical portion, a resilient compressible non-metallic member overlying said load-bearing plate and arranged to support a vibratory device, and means for yieldingly restraining excessive oscillations of said spring means in both axial directions, said restraining means being supported within said hollow frusto-conical portion of said bed plate.

6. A vibration-isolating mounting comprising a bed plate including a hollow raised central portion, a load-bearing plate, spring means supporting the load-bearing plate from the bed plate, a non-metallic member overlying said load-bearing plate, a cover plate overlying said last-named member, a bolt means projecting through said plates and out of contact with said bed and load-bearing plates and connected to said cover plate, and a resilient compressible body carried by and projecting beyond an end of said bolt means within said hollow raised central portion of the bed plate.

7. A vibration-isolating mounting comprising a bed plate including a hollow frusto-conical central portion, a load-bearing plate, a coil spring having one end resting on the bed plate and surrounding the frusto-conical portion and the other end supporting the load-bearing plate, a compressible non-metallic member overlying said load-bearing plate, a cover plate overlying said last-named member, and a snubber means including a shank extending through aligned apertures in said plates and into said frusto-conical portion of the bed plate and a resilient body carried by an end of the shank within said frusto-conical portion, and means adjustably connecting said shank to said cover plate.

8. A vibration-isolating mounting comprising a bed plate including a hollow frusto-conical central portion, a load-bearing plate, a coil spring having one end resting on the bed plate and surrounding the frusto-conical portion and the other end supporting the load-bearing plate, a compressible non-metallic member overlying said load-bearing plate, a cover plate overlying said last-named member, and a snubber means including a shank extending through aligned apertures in said plates and into said frusto-conical portion of the bed plate and a resilient body carried by and projecting beyond the end of the shank within said frusto-conical portion, and means adjustably connecting the shank to the cover plate, said shank extending beyond the cover plate for attachment of a machine to the mounting.

9. A vibration-isolating mounting comprising a bed plate including a hollow raised central portion, a load-bearing plate, a coil spring supporting the load-bearing plate from the bed plate, a compressible non-metallic member overlying the load-bearing plate, a cover plate overlying said last-named member, a snubber means including a threaded shank extending through aligned apertures in said plates and into said raised hollow portion, a nut secured about the aperture in the cover plate and threaded on said shank, and a resilient body carried by and projecting beyond the end of said shank extending within the hollow central portion of the bed plate.

10. A vibration-isolating mounting comprising a bed plate including a central hollow frusto-conical portion, a load-bearing plate, a coil spring including an end resting on the bed plate and surrounding the frusto-conical central portion and an end supporting the load-bearing plate, a compressible non-metallic member overlying the load-bearing plate, a cover plate overlying said last-mentioned member, aligned apertures in said several plates, snubber means including a shank extending through said aligned apertures and out of contact with said bed and load-bearing plates, and including an end within said frusto-conical hollow portion, a nut secured about the aperture in the cover plate and threaded on the shank, said snubber means including a rubber body secured to said shank within the frusto-conical central portion of the bed plate.

11. A vibration-isolating mounting comprising a bed plate, a load-bearing plate, spring means supporting the load-bearing plate from the bed plate, a compressible non-metallic member overlying the load-bearing plate, a cover plate overlying the last-named member, a snubber means including a threaded shank extending through aligned apertures in said plates and projecting beneath said bed plate, a nut secured to said cover plate about the aperture thereof and threaded on said shank, and a resilient body carried by and extending beyond the end of said shank projecting beneath said bed plate.

JOHN S. PARKINSON.
JAMES Y. DUNBAR.
WILLIAM A. JACK, 3RD.